Oct. 22, 1963

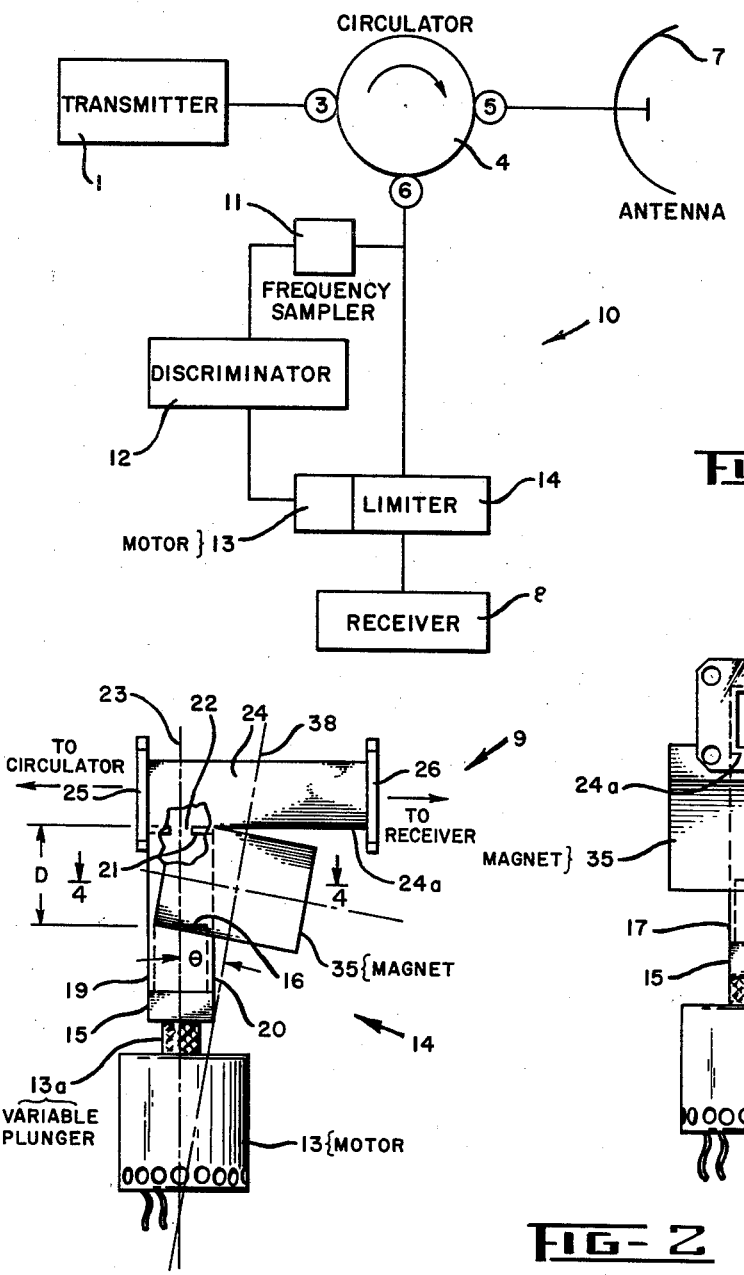

M. A. MEDINA 3,108,236

FERROMAGNETIC POWER LIMITER

Filed April 28, 1961

INVENTOR.
MARLOWE A. MEDINA

BY John F. Lawler

ATTORNEY

INVENTOR.
MARLOWE A. MEDINA
BY ATTORNEY

United States Patent Office 3,108,236
Patented Oct. 22, 1963

3,108,236
FERROMAGNETIC POWER LIMITER

Marlowe A. Medina, Sunnyvale, Calif., assignor to Sylvania Electric Products Inc., a corporation of Delaware
Filed Apr. 28, 1961, Ser. No. 106,299
3 Claims. (Cl. 333—24.2)

This invention relates to radar systems, and more particularly to limiters which provide protection for receivers of such systems.

A radar system usually comprises a radio frequency oscillator controlled by a modulator to generate high power periodic pulses which are transmitted by an antenna over a predetermined area of search. As an object enters the area of search, a portion of the energy is reflected to the antenna, and thereafter to a receiver wherein the direction and distance of the object are ascertained.

If a single antenna is used for both transmitting and receiving the pulses, a switching arrangement is used to isolate the receiver from damaging effects of the transmitted pulses and comprises means to electrically or mechanically disconnect the receiver from the antenna during transmission and to switch the antenna to the receiver as the reflected energy is being received.

In the past, several such switching devices have been used, the foremost of which is a duplexer such as described in "Electronic and Radio Engineering," by F. E. Terman (McGraw-Hill, 4th edition, 1955), at pages 1026 and 1027. In operation, this device comprises an associated power supply which activates a gas enclosed within a resonance cavity to ionize and destroy its resonance, thereafter short-circuiting the receiver and transmitter circuits.

In many instances, however, the weight of the power supply is a serious disadvantage reducing the use of such limiters to radar systems in ground situated applications. In addition, as the gas is sequentially ionized to destroy the resonance of the cavity and deionized to pass the signal, its walls permanently absorb a portion of the emitted ions, resulting in a loss in the effectiveness of the device as the volume of gas is reduced. Furthermore, the walls of the cavity define the resonance characteristics of the device such that the radar system is essentially a narrow band system. If interference of the outgoing pulse occurs, either by inadvertence, as by adjacently located electronic hardware, or by intentional measures by unknown sources, the duplexer prevents the frequency of the transmitted pulse from being changed rapidly to "unlock" the pulse. The result is inoperation of the radar system under such conditions.

Where it is feasible to substitute microwave limiters having ferrites actuated by permanent magnets, the problems of associated power supplies and short life of the ionized gases may be overcome. However, with use of such limiters, the problem of narrow band pulsing operation remains.

For example, where the devices comprise a ferromagnetic material such as a sphere of single crystal yttrium garnet, located at the junction of two crossed stripped transmission lines, the frequency response of resonators formed at this junction is fixed by the geometry of their walls, and that of the strip line configuration of the lines. In addition, when the sphere is biased to ferromagnetic resonance, by a properly oriented magnetic field as is well understood in the art ("Behavior and Applications of Ferrites in the Microwave Region," by A. G. Fox, S. E. Miller and M. T. Weiss, Bell Telephone Monograph 2370, pages 6–8), the frequency at which the electrons of the ferrite sphere precess must be compatible with the frequency of the signal. Such a requirement necessitates additional electrical tuning of the magnet with changes in signal frequency if broadband response of the device is desired.

In accordance with the invention, a ferrite power limiter having wide frequency response bands and automatic magnetic tuning comprises an yttrium iron garnet sphere mounted on a surface of a shorting plunger forming the end wall of a shorted waveguide resonant cavity. The cavity, in turn, is coupled to the side wall of a waveguide connecting the receiver of the radar system to an arm of a T junction circulator having a ferrite post located at the intersection of the arms as described in the copending application of G. J. Wheeler, Serial No. 59,579, entitled Broadband Nonreciprocal Microwave Transmission Device, assigned to the assignee of this application.

When magnetically biased, the sphere and cavity of the limiter absorb large portions of the high energy signals incident to the cavity while permitting low energy signals to pass therethrough substantially unimpeded.

In addition, the cavity rapidly adjusts to changes in signal frequency, having the shorting plunger directly connected to and integral with a shaft of a motor electrically connected in turn to the output terminals of a frequency discriminator. As variations in signal frequency occur, an output voltage, the magnitude of which is a function of changes in frequencies of the signal, energizes the motor, changing the response characteristics of the cavity.

Furthermore, variation in the applied magnetic field necessary for precession of the electrons of the sphere is simultaneously achieved by the geometric relationship of the sphere relative to the center of the magnet.

Therefore, the object of this invention is the provision of a microwave limiter for protection of receivers of radar systems having broad band frequency response characteristics. A specific object of the invention is the provision of a relatively light-weight compact limiter which is relatively simple to assemble and inexpensive to construct.

A further object of the invention is the provision of a limiter constructed with standard components and a ferrite element of a simple geometric configuration.

A more specific object is the provision of a limiter having high coupling efficiency for signals of low power and high isolation characteristics for signals of high power.

A more specific object is the provision of a compact broadband limiter in which applied magnetic field and inductive tuning of the cavity is accomplished simultaneously.

These and other objects will become apparent in the following specification, reference therein being made to the following drawings:

FIGURE 1 is a schematic diagram of a radar system utilizing the invention;

FIGURE 2 is a side view of a ferrite limiter embodying the invention showing the location of the garnet within the resonant cavity;

FIGURE 3 is a plan view, partially cut away, of the limiter illustrating the relative location of the magnet, resonance cavity, and waveguide section;

Figure 4:
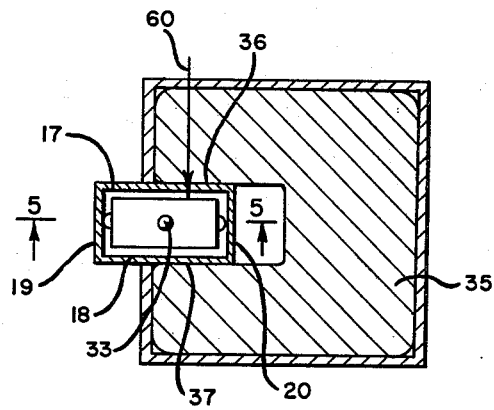
FIGURE 4 is an enlarged section taken along lines 4—4 of FIGURE 3 showing a ferrite sphere mounted on a plunger forming the end wall of the cavity.

In accordance with the invention, a ferromagnetic limiter responds to changes of power level of an electromagnetic wave traversing an adjacent waveguide. This device comprises a resonant cavity having a movable end wall whereon a ferrite sphere, magnetically biased, is located and which automatically adjusts the response characteristics of the cavity with changes in signal frequency. The ability to instantaneously change cavity response characteristics as signal frequency is varied facilitates the use of such limiters within radar systems, and for that reason a brief description of such operation is hereinafter presented.

Referring to FIGURE 1, a pulse of radio frequency energy representing a square wave is transmitted by a radio frequency transmitter 1 through arms 3 and 5 of circulator 4 to an antenna 7. The pulse radiates from antenna 7 to a target (not shown) within the area of search and is reflected thereby to the antenna from which it passes to a receiver 8 through arms 5 and 6 of circulator 4.

Circulator 4 isolates a large portion of the pulse of transmitter 1 from the receiver 8. For example, with a 1 kilowatt pulse, circulator 4 has a 20 decibel isolation between arm 3 and arm 6. This means that 10 watts of the input signal will appear at arm 6 of the circulator under such a condition. However, the energy content of the signal, i.e., 10 watts, is such that the receiver will be damaged if the signal is not attenuated.

To prevent such damage by the leaking power, a power limiter circuit 10 is located between isolator arm 6 and receiver 8. Limiter circuit 10 comprises cross guide coupler 11, a frequency discriminator 12, and a limiter assembly 9. Coupler 11 diverts one/one-thousandth of the pulse power to discriminator 12 which is tuned to the center frequency of the transmitted pulse.

In operation, discriminator 12 compares the incoming pulse with the original signal of the radar system. If there has been a change in the frequency of the transmitted pulse to alleviate interference with the original signal, a voltage proportional to this frequency shift is induced to activate motor 13, having a shaft 13a coupled to a plunger 15 forming end wall 16 of resonant cavity 14, which advances or retracts the end wall relative to the broadwalls 17 and 18 and side walls 19 and 20 of the cavity. Cavity 14 in turn is attached to waveguide section 24 (see FIGURE 3) which has flange 25 for attachment with arm 6 of circulator 4 and flange 26 for connection to the input of receiver 8.

It should be noted that the limiter 9 differs both in mode of operation and structure from the cavity of the duplexer and the ferromagnetic resonator device mentioned previously in that the limiter does not use ionized gas to change the resonance characteristics of the cavity or on the coupling effectiveness of adjacent resonators, but depends upon the combined effects of ferromagnetic resonance of a small sphere 33 (see FIGURE 4) of ferromagnetic material, preferably yttrium iron garnet, attached to plunger 15 and the resonant characteristics of cavity 14. The operation of this limiter is explained hereinafter.

Referring now to FIGURES 2–4, cavity 14 comprises a section of rectangular waveguide having broad walls 17 and 18, narrow side walls 19 and 20, and end wall 21 which is a part of side walls 24a and is attached to waveguide section 24 by the end edges of these walls. A slot 22 in end wall 21 (waveguide wall 24a) couples an electromagnetic signal from the waveguide section 24 and has an axis 22a coincident with the axis of symmetry 23 of the cavity.

As an electromagnetic wave or signal appears within waveguide 24 and is coupled with cavity 14, it should be remembered that the magnetic or electric field components of this signal interact while varying periodically with time and adjust their configuration to fit the boundaries of the waveguide. Since for a given field configuration, the resonance frequency of the cavity is defined by the volume of the cavity, and since the height and width of the cavity are fixed, changes in frequency characteristic of the signal are compensated by movement of end wall 16.

Figure 5:
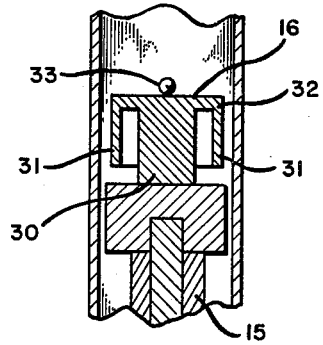
FIGURE 5 is a section taken along line 5—5 of FIGURE 4 showing the folded choke and ferrite sphere.

Referring now to FIGURE 5, movable end wall 16 comprises a folded choke 30 having a standard folded arm arrangement 31 which acts as a short at point 32 of end wall 16. Most important, however, choke 30 is also a mount for ferromagnetic sphere 33 which is tangentially attached as by a suitable adhesive at the geometrical center of wall 16.

Adjacent to sphere 33 in contact with broad walls 17 and 18 of the cavity are pole faces 36 and 37 of permanent magnet 35 (see FIGURE 4) across a unidirectional field is produced in the direction of the arrow 60 in FIGURE 4. The intensity of this field is such as to bias the sphere 33 to ferromagnetic resonance. The magnet is oriented skew to the longitudinal axis 23 of the cavity such that magnet axis 38 (FIGURE 3) and the pole faces make an angle $\theta$ with axis 23 of the cavity 14. This arrangement results in a magnet field of uniformly diminishing intensity along the path of movement of the sphere so that as the sphere is physically moved along cavity axis 23, the magnetic field which biases it increases or decreases depending on the direction of plunger movement. The relationship between the magnetic field strength required to properly bias sphere 33 and movement of plunger 15 will be explained further below.

When sphere 33 is properly oriented with respect to magnet 35, the cavity acts as a non-linear power-sensitive limiter whose performance may be explained on the basis of the combined effects of two underlying principles which will now be described. The following analysis is offered only as an interpretation of observed facts, however. The first principle upon which the device is dependent is the relationship between resonance frequency shift ($df$) of cavity 14 as sphere 33 is magnetically biased to ferromagnetic resonance in the presence of an electromagnetic wave. This relationship is well-understood in the art and is given in "Untersuchungen uber Electromagnetische Hohlraume," by J. Müller, Hochfrequenztechnik und Elektroakustik, volume 54, page 157, as $$\frac{df}{f} = -\frac{dw}{2w} \qquad (1)$$

wherein $w$ is the energy content of the empty cavity, $dw$ is an increase in the energy content of the cavity, $f$ is the resonant frequency of the cavity and $df$ is the small change in resonance frequency caused by sphere 33 being magnetized by a magnet 35 to ferromagnetic resonance in the presence of an electromagnetic wave.

To properly interpret Equation 1, the volume of the sphere must be small compared to the wavelength of a microwave signal so that the strength of the electromagnetic field component of low power signals is uniform over the sphere. In this regard, a sphere having a .020 inch diameter was found satisfactory where frequency of signal was between 8.5 and 9.6 kilomegacycles.

In operation, as a signal is coupled into the cavity, a shift in the resonant frequency of the cavity occurs due to absorption of signal energy of the magnetically biased sphere. The absorption effect of ferrite in such resonance condition on low power signals has been explained as being due to the action of the magnetic field upon the unpaired electrons associated with the metallic elements of the sphere.

For example, as a unidirectional magnetic field is applied to the ferrite, the magnetic moments of free electrons in the ferrite line up parallel with the field indicated by arrow 60 in FIGURE 4. The frequency of the precession depends upon the strength of this field, but in the usual case the electron axes become parallel with the direction of the field, the magnitude of the precession is damped.

However, when the magnetic field component of the electromagnetic wave within the cavity is perpendicular with respect to the field of the magnet, and has a frequency equal to the uniform precession of the electrons, the electrons will continue to precess instead of being damped. Although the amount of energy thus absorbed depends upon the difference between the frequency at which the electrons normally tend to precess, which is a function of the applied field, and the frequency of the electromagnetic waves within the guide (i.e., directly proportional to the frequency detuning of the cavity), the volume of the sphere is limited such that in practice the amount of energy absorbed by the sphere is negligible. For example, in the embodiment described hereinafter, if the power of the electromagnetic signal in the cavity 14 is 1 watt, the energy absorbed by the sphere is 10 milliwatts.

In the instant device, the antithesis of this relationship is used in which the cavity 14 within which the sphere 33 is mounted is not resonantly tuned to a low power signal traversing the waveguide 24. For example, for a signal in waveguide 24 which is in the milliwatt range, the resonant frequency of the cavity does not equal the frequency of the signal.

Although some energy ($dw$ in Equation 1) of such a wave is absorbed when the sphere is biased by a magnet, the magnitude of energy absorbed is not sufficient to shift the resonant frequency of the cavity to equal that of the signal. For example, if $f_1$ equals the frequency of the signal, and $f_c$ equals resonant frequency of the cavity, and $f_2$ is the final resonance frequency of the cavity, $f_2$ does not equal $f_1$; or expressed differently, electrical distance "D" illustrated in FIGURE 3, between sphere 33 and slot 22 of the assembly, is not equal to $n\lambda_g/2$ where $\lambda_g$ equals the waveguide wavelength which is a function of frequency of the signal in cavity 14 and $n$ equals any integer, i.e., 1, 2, 3, ad infinitum.

However, when high power signals (i.e., high amplitude signals), are traversing waveguide section 24 as ferrite sphere 33 is magnetically biased, an analogous situation occurs in that large amounts of energy are absorbed from the signal. The reason for this anomalous power absorption exhibited by ferrites at high microwave signal levels has been hypothesized ("The Non-linear Behavior of Ferrites at High Microwave Signal Levels," Proceedings of the I.R.E., October 1956, volume 44, pages 1270–1284, by H. Suhl), wherein the conditions under which the anomalies are observed coincide with the conditions under which spin wave disturbances in the medium grow to high levels.

It is believed this growth is caused by coupling of the spin waves of the uniform precession through the demagnetizing and exchange fields such that the spin wave amplitude runs over exponentially when the signal field exceeds a threshold value. The excitation of the spin waves allows the precession angle (i.e., angle between the magnetic field axis and the axis of the spin moment of the electrons) of the electron spins to increase exponentially until a new steady state condition occurs. This increase in energy in turn changes the resonant frequency of the cavity to correspond with the resonant frequency of the wave of the signal. Using the terms indicated above, the frequency difference between $f_2$, the final resonant frequency of the cavity, and $f_1$, the original signal frequency, is negligible; or the electrical distance "D," FIGURE 3, between sphere 33 and slot 22 is substantially equal to $n\lambda_g/2$ as defined hereinabove. Thus when the cavity is at resonance, almost the entire high power signal is absorbed in the cavity.

Figure 6:
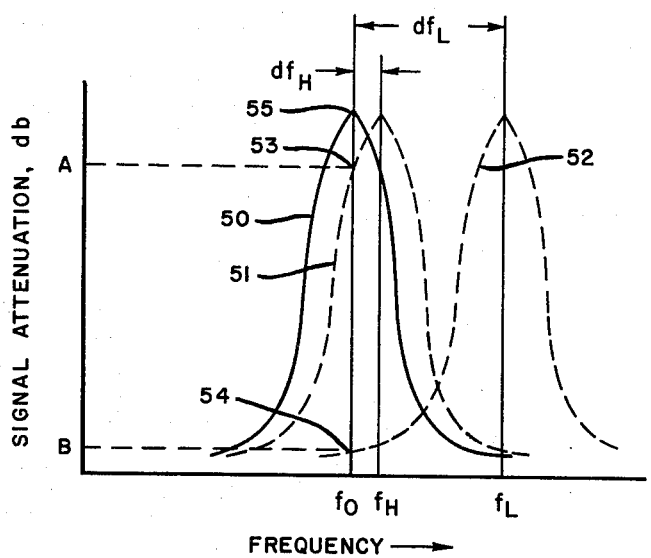
FIGURE 6 is a curve of changes in signal attenuation in decibels of the limiter with changes in the resonant frequency in the cavity.

The combined effects of these principles as described above, are illustrated by curves 50, 51, and 52 in FIGURE 6. Curve 50 illustrates attenuation of a signal having a center frequency coincident with the resonant frequency of the cavity, i.e., $f_0$ on the abscissa, and shows that signal attenuation increases and decreases rapidly about $f_0$, peaking at point 55. Broken-line curve 51 with a physical outline similar to curve 50, illustrates attenuation characteristic of high power signal with a center frequency $f_H$ shifted by $df_H$ from $f_0$. The intersection 53 of curve 51 and $f_0$ indicates the attenuation of a high power signal is high, for example, A decibels on the ordinate axis of the figure. Broken-line curve 52 illustrates the attenuation of a low power signal having a center frequency $f_L$ which is spaced a substantial amount $(df_L)$ from $f_0$ and intersects the latter at 54 where signal attenuation is relatively low, for example, B decibels.

However, it should be noted that the shift in the resonant cavity characteristics for high and low power signals as illustrated is a function of the cavity as well as a function of the ferrite material and is believed to be a function of the combined effects of the ferrite material and the properties of the cavity resonator.

Figure 7:
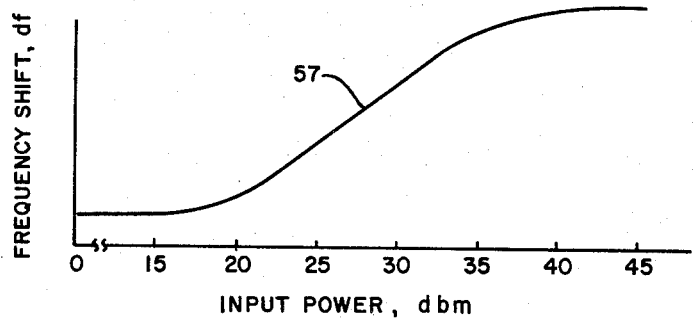
FIGURE 7 is a plot of the frequency shift of the cavity versus change in input power of a radio frequency signal traversing the waveguide section.

Power dependent characteristics of the cavity, i.e., the shift of resonant frequency of the cavity with increase in input power, is illustrated in FIGURE 7 by curve 57 which rises with signal power increase, resulting in an increase in frequency shift $(df)$ of the cavity.

In order to have precession of the electron spin moments about the axis of the unidirectional magnetic fields so that there is an energy exchange between the precessing electrons and the magnetic component of the signal, the frequency at which the precession occurs must be proportional to increases or decreases of the frequency of the signal. For example, in order to have interaction between precessing electrons of the ferrite sphere and the electric field component of the signal, the signal frequency is increased as the unidirectional magnetic following field must also be increased, as is shown by the following equation:

$$H_{dc} = \frac{2\pi}{\gamma}(f) \qquad (2)$$

where $H_{dc}$ is the applied unidirectional field, $f$ is the center frequency of the signal and $\gamma$ is the gyromagnetic ratio of the electron equal to 17.60 megaradians/oersted.

In the instant embodiment, for example, the required increase in strength of the applied magnetic field is achieved simultaneously with the change in resonant characteristics of the cavity, the latter change being induced to adjust to increasing or decreasing signal frequency. For example, as the cavity volume is decreased, sphere 33 is physically relocated relative to magnet 35 so that the strength of the field biasing the sphere is increased. As shown in FIGURE 3, axis 38 of the magnet forms an angle $\theta$ with the axis 23 of the cavity so that areas of the pole faces in alignment with the cavity diminish uniformly over the length of the cavity (from bottom to top as shown). As plunger 15 moves to decrease the volume of the cavity (upward in FIGURE 3), the offset of the sphere from axis 38 of the magnet increases, the offset being a function of the angle $\theta$ and the position of plunger in the cavity. Movement of the plunger therefore tunes the cavity and effectively adjusts the strength of the applied field.

Another factor which influences the efficiency of interaction of the signal and the electrons of the gyromagnetic sphere is the linewidth of the material in the sphere. Linewidth is defined as the incremental field between the peak on the resonance absorption curve of the sphere and absorption at one-half of peak resonance. It has been found by experiment that performance of the limiter is significantly better when the absorption curve of such spheres is extremely narrow, in the order of 1 oersted.

The reason for this requirement can be ascertained upon closer analysis of Equation 1 after its terms are simplified:

$$\frac{df}{f} = -\frac{dw}{2w} = \frac{H_0 M + E_0 P}{4w} \quad (3)$$

as described by Smit and Wijn, Ferrites; Physical Properties of Ferrimagnetic Oxides in Relation to Their Technical Applications, John Wiley and Sons, New York, 1959, pages 131 and 132, the term $H_0 E_0$ being the field strength of the signal of an empty cavity, and M and P being the magnetic and electric moments, respectively, of the sphere. Further simplification to the right hand term of equation 3 is possible because the wave traversing the waveguide at the location of the sphere 33 has magnetic and electric fields of the $TE_{101}$ mode. Since the $E_0$ field at the end wall 16 adjacent sphere 33 is zero, and Equation 3 becomes $$\frac{df}{f} = \frac{H_0 M}{4w} \quad (4)$$

which describes the frequency shift of the cavity in terms of the magnetic field strength of the signal $H_0$ and the magnetic moment M of the sphere.

At low signal levels, the interaction between the signal and sphere is normal (i.e., between the $H_0$ and M) and the precession of the electrons of the sphere is sustained by the absorption of energy from the magnetic field of the signal. At high incident signals and at critical fields, however, a high proportion of signal energy is absorbed due to the spin-wave effects described above.

Figure 10:
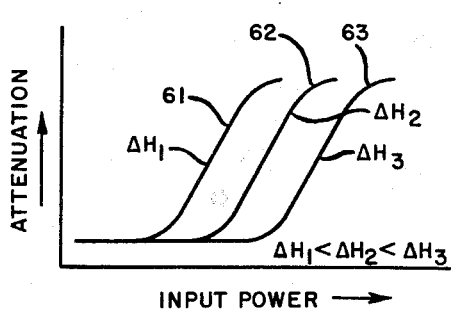
FIGURES 9 and 10 are plots illustrating the relationship of linewidth of the ferrite sphere and signal power for operation of the limiter.

This critical $H_0$ field at which absorption takes place is related in the limited case to the linewidth $\Delta H$ of the sphere as follows:

$$H_0 = h_c = \Delta H \sqrt{\frac{3.08 \Delta H}{4\pi M}} \quad (5)$$

which is illustrated in FIGURE 10, wherein curves 61, 62, and 63 illustrate power level of the signal at which the spin wave effect occurs is a direct function of the linewidth $\Delta H$, and the greater the linewidth the higher is the power requirement to induce a limiting condition. In these curves, curve 61 illustrates that attenuation of a signal by a limiter in which the sphere having linewidth $\Delta H_1$ increases rapidly over a predetermined power input range. Curve 62 illustrates a similar attenuation pattern for a similarly constructed limiter, but for which the sphere has a linewidth $\Delta H_2$, while curve 63 illustrates the signal attenuation pattern of a third limiter having a sphere having a linewith $\Delta H_3$, wherein $\Delta H_1$ is less than $\Delta H_2$ which is less than $\Delta H_3$.

Figure 9:
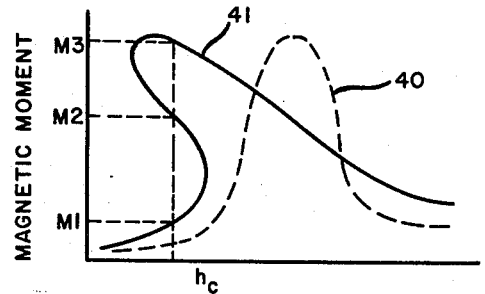

In each of these cases for the range of input powers in which a rapid increase in signal attenuation occurs, there is a critical $H_0$ at which value the normal response curve 40 of FIGURE 9 folds over to form curve 41 wherein a range of magnetic fields ($H_0$) in which the conventional electron motion is unstable. In practice, this threshold occurs when the magnetic field is below resonance by an amount of the order of the linewidth, and creates a triple valued magnetic moment, i.e., $M_1$, $M_2$, and $M_3$, FIGURE 9, in which $M_2$ and $M_3$ are unstable, i.e., at a level in which such moments move as a single unit in the applied signal field. Since this motion is not stable but is random, the precession motion of the moment gives up energy to the field in the sphere and large amounts of signal energy are absorbed, the latter shifting the resonant frequency of the cavity a substantial degree.

Figure 8:
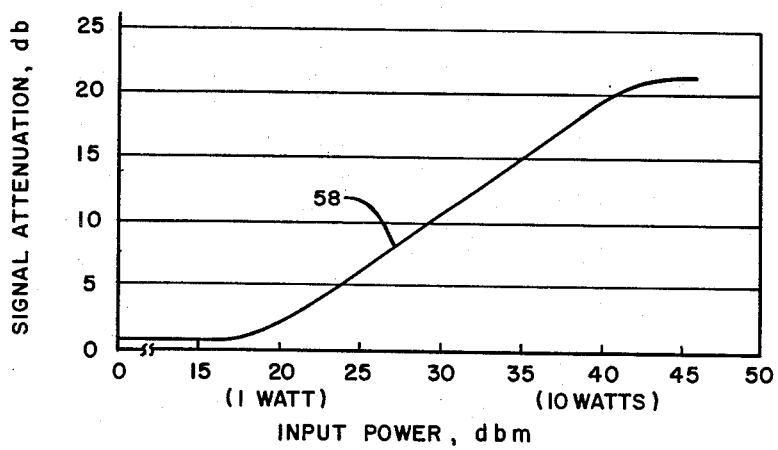
FIGURE 8 is a plot of signal attenuation versus changes in input power signals at different frequencies.

To illustrate the above described characteristics, a device having the following dimensions was successfully tested as illustrated by performance curve 58 of FIGURE 8.

| Item: | | Dimensions |
|---|---|---|
| Broadwalls 17 and 18 of cavity 14 | inch | 0.900 |
| Sidewalls 19 and 20 of cavity 14 | do | 0.400 |
| Length of cavity 14: | | |
| At 8.5 kmc | do | 1.09 |
| At 9.6 kmc | do | 0.84 |
| Slot 22: | | |
| Length | do | 0.400 |
| Width | do | 0.320 |
| Plunger 15: | | |
| Length | do | 0.840 |
| Width | do | 0.860 |
| Height | do | 0.335 |
| Magnet 35: | | |
| Strength— | | |
| At axis 35 | gauss | 34000 |
| At outer edge | do | 3000 |
| Length | inches | 2 7/16 |
| Width | do | 2 1/8 |
| Height | do | 2 9/16 |
| Angle $\theta$ | degrees | 11 |

Performance curve 58 indicates that signal attenuation increases as signal input power increases, there being substantially a linear relationship in the 20 to 40 dbm range of input power.

Another example will serve to illustrate the capability of the limiter. Referring to FIGURE 1, assume a 1 kilowatt signal is being transmitted and circulator 4 has 20 decibel isolation between its arms 3 and 6. Of the total power, only 10 watts therefore appears at circulator port 6. Limiter 9, in accordance with performance curve 58 in FIGURE 8, attenuates the 10 watt (40 dbm) input an additional 20 decibels so that the signal reaching the receiver is 100 milliwatts. Thus 99% of the total transmitted power is prevented from reaching the receiver.

A signal reflected from a distant target to the antenna 7 is generally in the milliwatt range, i.e., from 0 to 16 dbm in the abcissa of FIGURE 8. For this power level, the limiter introduces about 1 decibel of isolation (see FIGURE 8), and the received signal is attenuated by 20%.

It should be understood that this invention in its broadest aspects is not limited to the specific examples herein illustrated and described. The following claims are intended to define the scope of the invention.

I claim:

1. In combination, a power limiter having non-linear ferromagnetic characteristics, comprising first and second rectangular waveguides having opposed broad and narrow walls and being joined together in a T configuration, said first waveguide having ports through which a radio frequency signal propagates; means for electromagnetically coupling said signal from said first waveguide to said second waveguide, said second waveguide having an end wall remote from said coupling means, said end wall being movable longitudinally of said second waveguide whereby to adjust the effective electrical length of said second guide to a value less than $\lambda g/2$ where $\lambda g$ is the waveguide wavelength of said signal; means for automatically moving said end wall relative to said cavity comprising a power divider, a frequency discriminator, and an electromechanical transducer, said power divider having input and output terminals, said input terminal being connected to said first waveguide for sampling said signal in said first waveguide, said frequency discriminator being connected to said output terminal of the power divider and producing an output voltage proportional to changes in the signal frequency, said transducer being electrically connected to the output of said discriminator and mechanically connected to said end wall and being responsive to said voltage whereby to move said end wall longitudinally of said second waveguide, the spacing between said end wall and said coupling means of said second guide being varied to a value which is less than $\lambda g/2$ for the changed signal; an yttrium iron garnet sphere having a linewidth that is small compared with the wavelength of said signal and being located on said end wall; and magnet means for producing a unidirectional magnetic field of constant strength across said sphere, said unidirectional magnetic field magnetizing said sphere to ferromagnetic resonance wherein a plurality of magnetic moments are formed in said sphere, said sphere being responsive to a predetermined radio frequency magnetic field for changing said electrical length in said second waveguide to a value equal to $\lambda g/2$, the relationship of said predetermined magnetic field and said sphere being $$H_{rf\ critical} = \Delta h \sqrt{\frac{3.08\ \Delta h}{4\pi M}}$$

where $\Delta h$ equals the linewidth of the sphere and M is the sum of said magnetic moments in said sphere.

2. In combination, a rectangular waveguide cavity having opposed narrow and broad walls and first and second end walls, said end walls being positioned normal to said narrow and broad walls; a second waveguide member joined to said waveguide cavity at said first end wall to form a T configuration, said second waveguide member being adapted to propagate a radio frequency signal having a dominant $TE_{101}$ mode; means for coupling portions of said signal from said waveguide member to said waveguide cavity at said first end wall whereby the radio frequency electric field of said signal is zero and the radio frequency magnetic field is finite at said second wall of said waveguide cavity; an yttrium iron garnet sphere attached to said second end wall, said second end wall being movable longitudinally of said second waveguide whereby to adjust the effective electrical length of said waveguide to a value less than $\lambda g/2$ where $\lambda g$ is the waveguide wavelength of said signal; means for automatically moving said end wall longitudinally of said cavity to said location comprising a power divider and a frequency discriminator and an electromechanical transducer electrically connected in series and shunting said first waveguide, said power divider being connected to said second waveguide, said transducer being connected to said second end wall; and a magnet mounted externally of the broad walls of said waveguide cavity and having pole faces skewed relative to the longitudinal axis of said cavity, said magnet producing a unidirectional magnetic field of constant strength across said sphere, the intensity of said unidirectional magnetic field producing ferromagnetic resonance in the sphere, said sphere being responsive to a predetermined radio frequency magnetic field for changing said electrical length in said second waveguide to a value equal to $\lambda g/2$, the relationship of said predetermined magnetic field and said sphere being $$H_{rf\ critical} = \Delta h \sqrt{\frac{3.08 \Delta h}{4\pi M}}$$

where $\Delta h$ equals the linewidth of the sphere and M is the sum of said magnetic moments in said sphere.

3. A power limiter having non-linear ferromagnetic characteristics, comprising first and second rectangular waveguides joined together in a T configuration, each of said waveguides having opposed broad and narrow walls, said first waveguide having input and output ports through which a microwave signal propagates, coupling means between said ports for coupling said signal from said first waveguide to said second waveguide, said second waveguide having an end wall electrically spaced from said coupling means by a distance less than one-half a waveguide wavelength, and a magnetized yttrium iron garnet sphere located on said end wall, said sphere being responsive to a predetermined radio frequency magnetic field for changing said electrical length to a value equal to one-half a waveguide wavelength, the relationship of said predetermined magnetic field and said sphere being $$H_{rf\ critical} = \Delta h \sqrt{\frac{3.08 \Delta h}{4\pi M}}$$

where $\Delta h$ is equal to the linewidth of the sphere and M is the sum of magnetic moments in said sphere.

References Cited in the file of this patent
UNITED STATES PATENTS 2,866,165   Zaleski _____ Dec. 23, 1958

OTHER REFERENCES

Artman et al.: Article, "Measurement of Susceptibility," Journal of Applied Physics, vol. 26, No. 9, September 1955, pages 1124–1132 relied upon.

White et al.: Article, "Multiple Ferromagnetic Resonance," Physical Review, vol. 104, No. 1, Oct. 1, 1956, pages 56–62 relied upon.

Dillon: "Ferromagnetic Resonance," Physical Review, Jan. 15, 1957, pages 759 and 160.

Sperry: "Microwave Transmission Design Data," Publication No. 23–80, page 142 relied on, May 1944.